(12) United States Patent
Lim et al.

(10) Patent No.: US 7,777,679 B2
(45) Date of Patent: Aug. 17, 2010

(54) MOBILE TERMINAL

(75) Inventors: Sang Yeon Lim, Seongnam-si (KR); Young Suk Oh, Daejeon-si (KR)

(73) Assignee: LG Electronics Inc., Seoul (KR)

( * ) Notice: Subject to any disclaimer, the term of this patent is extended or adjusted under 35 U.S.C. 154(b) by 637 days.

(21) Appl. No.: 11/759,864

(22) Filed: Jun. 7, 2007

(65) Prior Publication Data
US 2007/0287504 A1 Dec. 13, 2007

(30) Foreign Application Priority Data
Jun. 7, 2006 (KR) .................. 10-2006-0051012

(51) Int. Cl.
*H01Q 1/24* (2006.01)
*H04B 1/38* (2006.01)

(52) U.S. Cl. .................. 343/702; 455/566; 455/90.3

(58) Field of Classification Search .................. 343/702; 455/90.3, 566
See application file for complete search history.

(56) References Cited

U.S. PATENT DOCUMENTS

| | | | |
|---|---|---|---|
| 2006/0187212 A1* | 8/2006 | Park et al. | 345/169 |
| 2007/0270107 A1* | 11/2007 | Vanska et al. | 455/90.3 |
| 2009/0110352 A1* | 4/2009 | Schorpp et al. | 385/37 |

* cited by examiner

*Primary Examiner*—Shih-Chao Chen
(74) *Attorney, Agent, or Firm*—Lee, Hong, Degerman, Kang & Waimey (57) ABSTRACT

A mobile terminal is disclosed. The mobile terminal includes a first body including a display for displaying information, and a second body including a receiving part for receiving the first body. The receiving part has a part of the surface cut out to enable the display to display information while the first body is at least partially received by the second body.

20 Claims, 11 Drawing Sheets

MOBILE TERMINAL

This application claims the benefit of Korean Patent Application No. 10-2006-0051012, filed on Jun. 7, 2006, which is hereby incorporated by reference as if fully set forth herein.

BACKGROUND OF THE INVENTION

1. Field of the Invention

The present invention relates to a mobile terminal, and more particularly, to a mobile terminal capable of conveniently providing information desired by the user.

2. Discussion of the Related Art

Generally, mobile terminals are well known as a communication device, enabling a user to communicate wirelessly with the another user. Such mobile terminals are classified into various types such as bar type, a flip type, and a folder type.

Recently, various types of folder-type mobile terminals, capable of being opened at various angles, are being developed. In addition, the mobile terminals being developed today are being equipped with various functions in addition to a general voice communication function.

In particular, the mobile terminals are being given various multimedia functions associated with wireless internet, games, text messages, and moving pictures in addition to basic functions.

According to the use patterns, the users more frequently use the functions associated with playback of multimedia contents (e.g., reception of mobile broadcasting data) as compared to voice communication.

However, conventional mobile terminals have a problem in that they can only display received information as is, without efficiently displaying information selectively desired by the user. Furthermore, conventional mobile terminals cannot display information desired by the user, in various manners.

SUMMARY OF THE INVENTION

Accordingly, the present invention is directed to a mobile terminal that substantially obviates one or more problems due to limitations and disadvantages of the related art.

An object of the present invention is to provide a mobile terminal capable of allowing the user to conveniently access information desired by the user.

Another object of the present invention is to provide a mobile terminal capable of displaying information desired by the user, in various manners.

Still another object of the present invention is to provide a mobile terminal capable of reducing the power consumption required upon obtaining information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal comprises: a first body including a display, and a second body including a receiving part for receiving the first body, the receiving part having a part of a surface cut out to enable the display to display information. while the first body is at least partially received by the second body.

The first body may be inserted into or extended from the receiving part in a sliding manner.

The mobile terminal may further comprise a position sensor for sensing a degree of extension of the display from the receiving part.

The position sensor may comprise a first position sensor arranged at the first body, and a second position sensor arranged at the second body such that the second position sensor corresponds to the first position sensor.

The mobile terminal may further comprise a controller for adjusting a screen configuration displayed on the display, based on data measured by the position sensor.

The mobile terminal may further comprise an antenna arranged in at least one of the first and second bodies, to receive information from an external source.

The antenna may comprise a first antenna arranged in the first body, and a second antenna arranged in the second body. The second antenna may receive at least a portion of the first antenna when the first body is inserted into the receiving part of the second body.

The first and second antennas may operate as an integral antenna when the first body is extended from the receiving part of the second body.

The mobile terminal may further comprise a guide for guiding a movement path of the first body when the first body is extended from the second body.

The mobile terminal may further comprise a coupler for coupling the first and second bodies when the first body is extended from the receiving part, or releasing the first and second bodies from each other when the first body is inserted into the receiving part.

The coupler may comprise a moving member coupled to the first body, to move along with the first body, a rotating member operatively connected to the moving member, to rotate in accordance with the movement of the moving member, and an elastic member having a resilience against the movement of the moving member.

The mobile terminal may further comprise a hinge for tilting the first body with respect to the second body in an extended state of the display from the receiving part.

In another aspect of the present invention, a mobile terminal comprises: a first body including a display for displaying information, a second body having a front surface with a substantially-rectangular shape, the second body being opened at a portion of one longer side of the rectangular shape, to have a receiving part for receiving the first body, a mobile broadcasting receiver arranged in at least one of the first and second bodies, and a controller arranged in at least one of the first and second bodies, to control the display and the mobile broadcasting receiver.

The receiving part may have a front surface partially cut out to outwardly expose a portion of the display when the first body is completely received in the receiving part.

The mobile broadcasting receiver may include an antenna arranged in the first body or in the second body such that the antenna is not outwardly exposed in a state in which the first body is received in the receiving part.

The mobile broadcasting receiver may include a first antenna arranged in the first body and a second antenna arranged in the second body. The first and second antennas may function as an integral antenna when the first body is outwardly extended from the receiving part.

In still another aspect of the present invention, a mobile terminal comprises: a first body including a display for displaying screen information, a second body including a receiving part for receiving at least a portion of the display, and a controller for changing the screen information in accordance with an outwardly-exposed area of the display.

The controller may control the display to display the screen information in a screen size proportional to an extension degree of the display from the receiving part.

The display may display the screen information only on a screen portion of the display outwardly exposed in a state in which the display is received in the receiving part.

The screen information on the display may be displayed in a sliding manner such that the screen information moves in a specific direction while being displayed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2A to 2E illustrate the mobile terminal of FIG. 1 in which

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
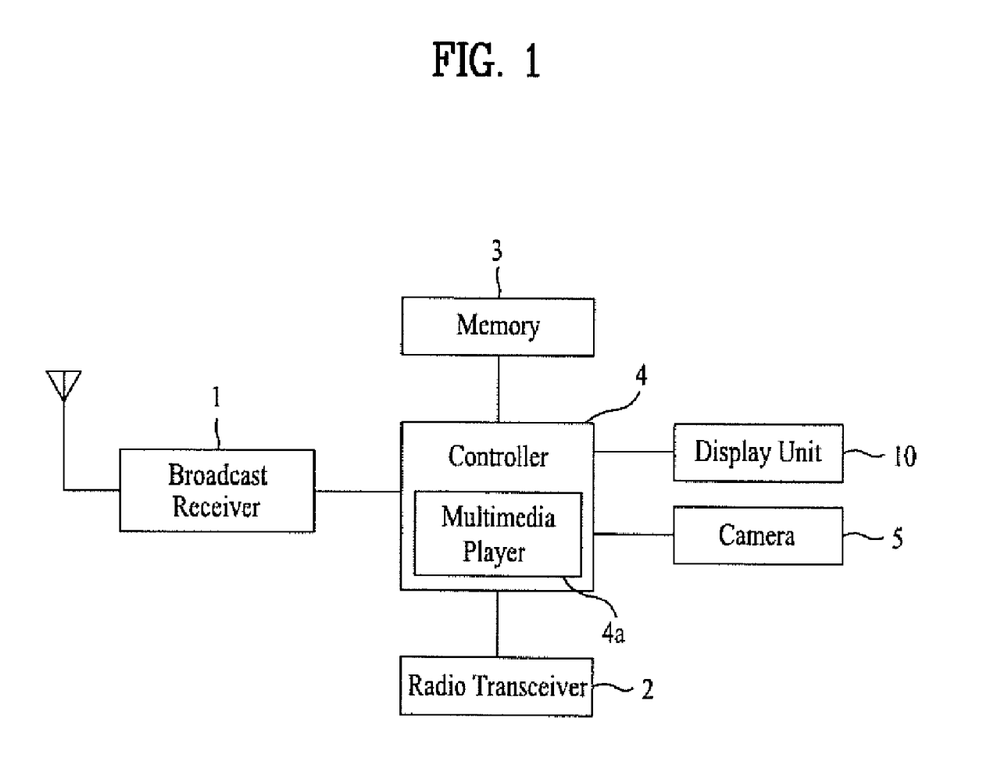
FIG. 1 is a block diagram schematically illustrating a configuration of a mobile terminal according to an exemplary embodiment of the present invention.
Figure 2A:
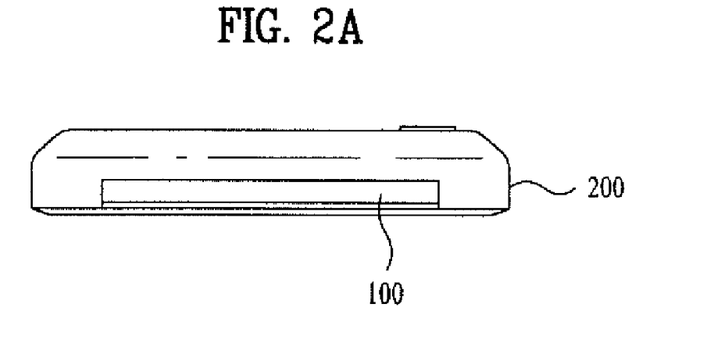
FIG. 2A is a plan view.
Figure 2B:
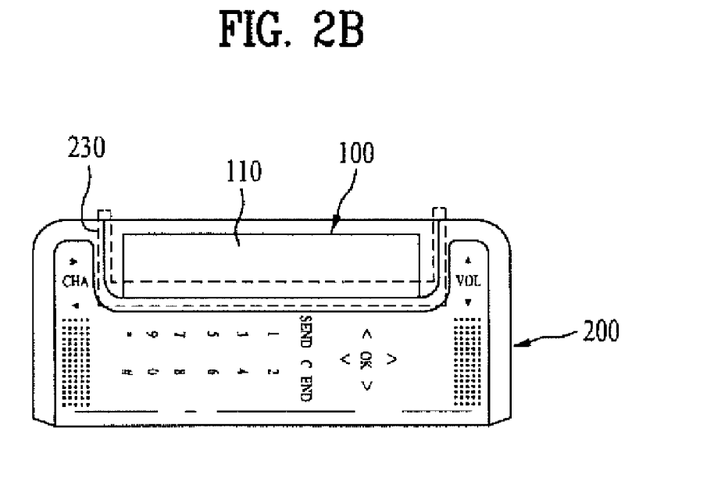
FIG. 2B is a front view.
Figure 2C:
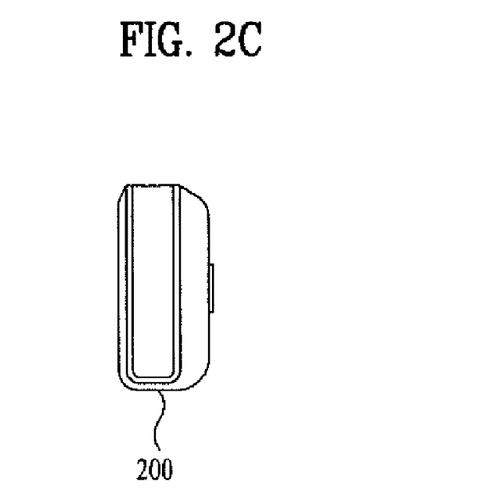
FIG. 2C is a side view.
Figure 2D:
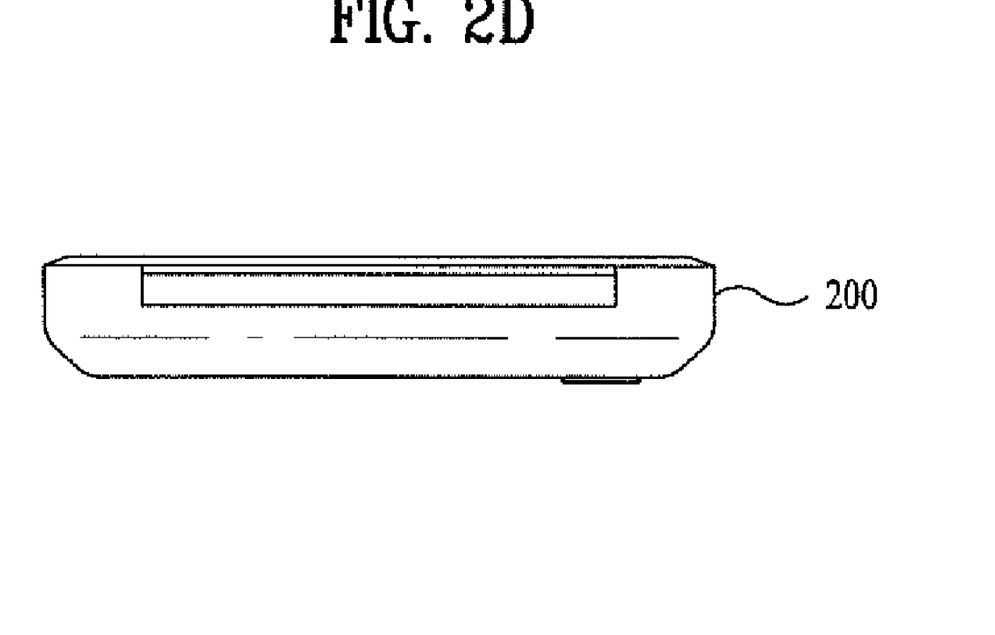
FIG. 2D is a bottom view.
Figure 2E:
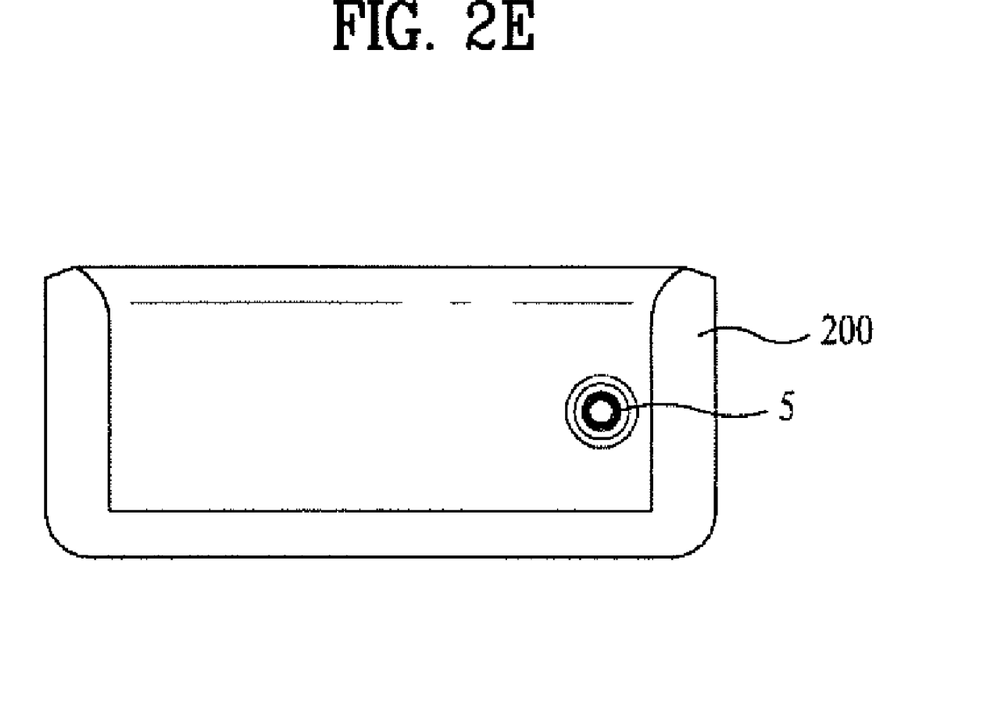
FIG. 2E is a rear view.
Figure 3:
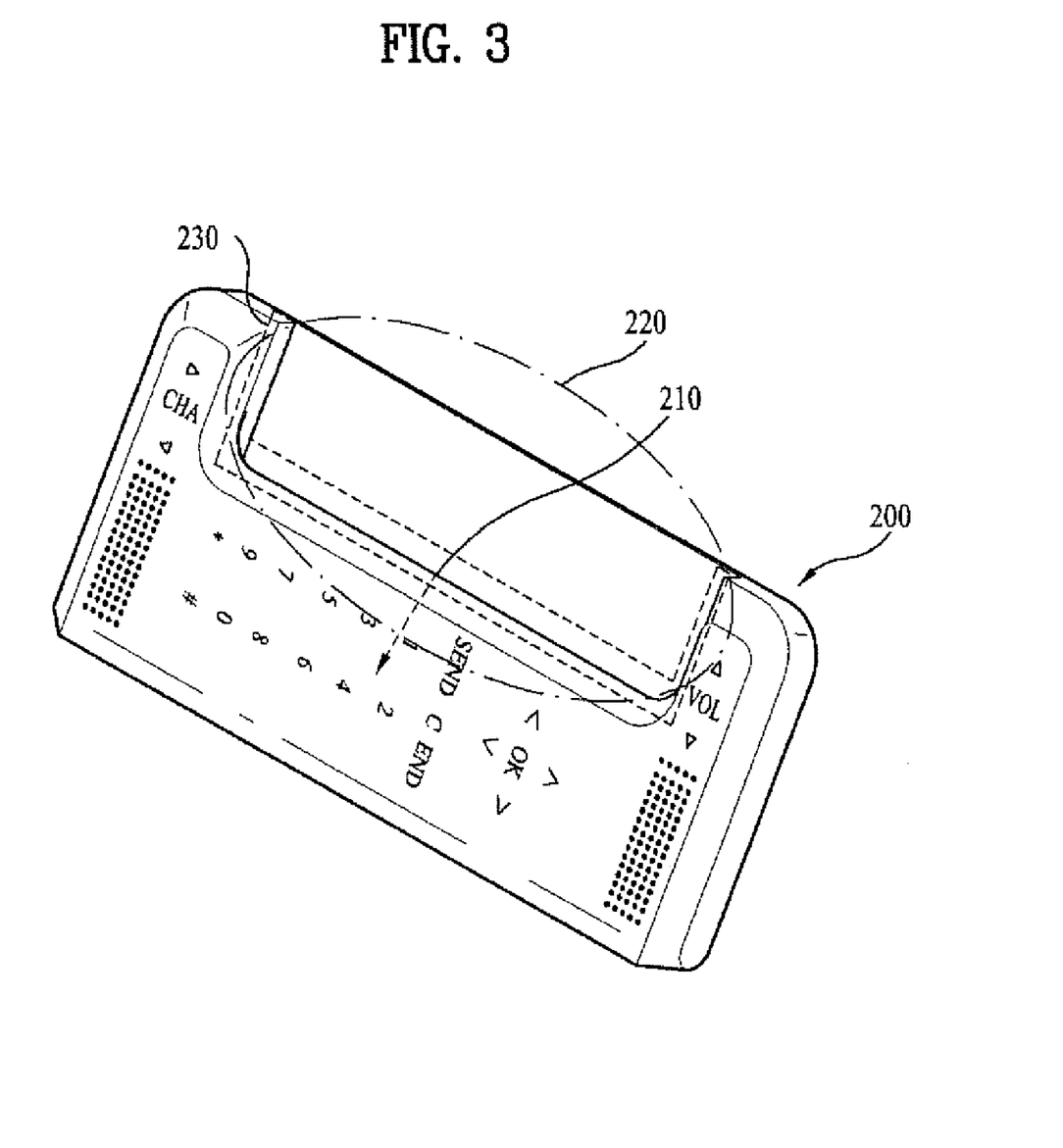
FIG. 3 is a perspective view illustrating a second body included in the mobile terminal of FIG. 1.
Figure 4:
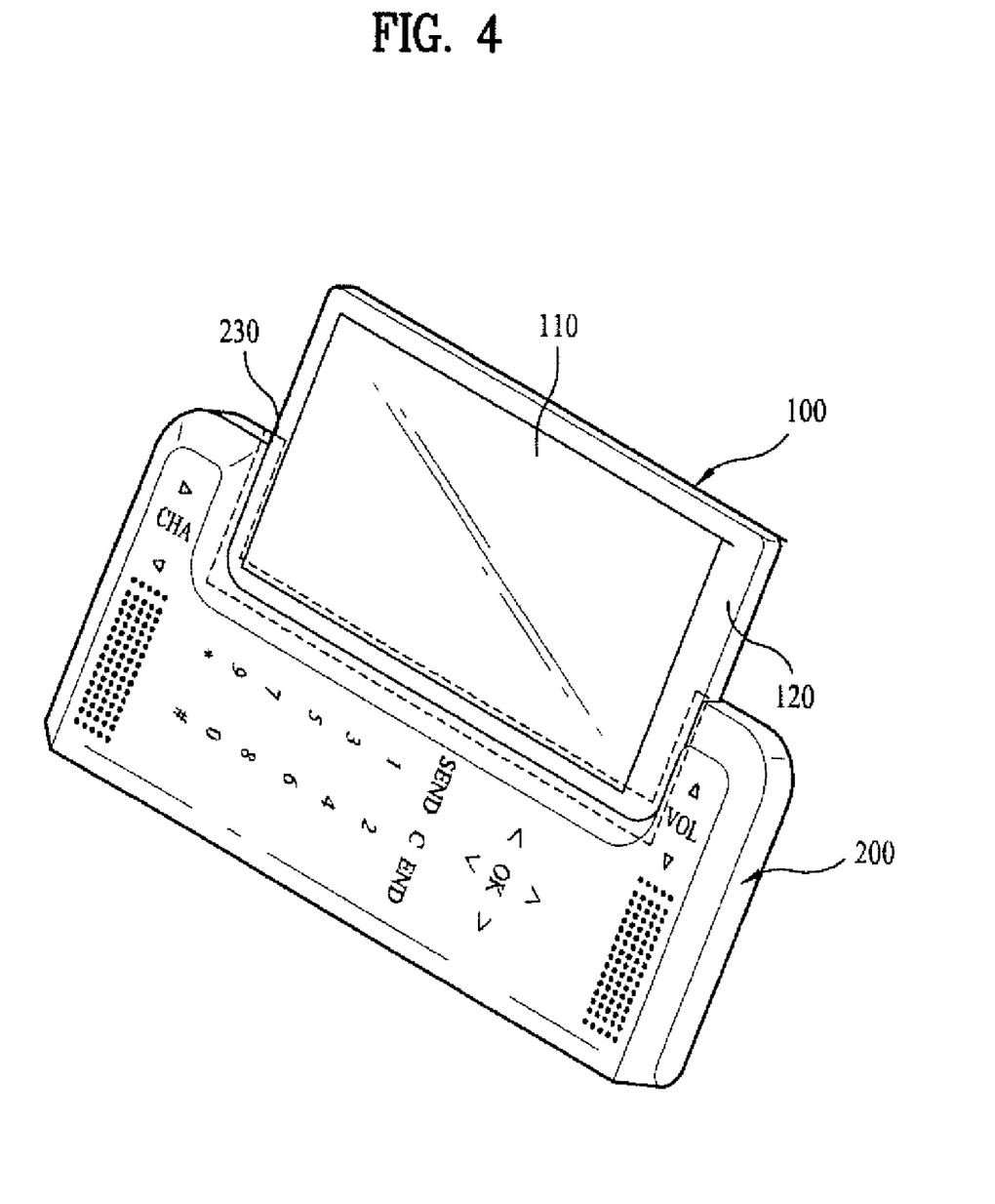
FIG. 4 is a perspective view illustrating a state in which a first body has been extended from the second body in the mobile terminal of FIG. 1.

FIG. 1 is a block diagram schematically illustrating a configuration of a mobile terminal according to an exemplary embodiment of the present invention. FIGS. 2A to 2E illustrate the mobile terminal of FIG. 1 through a plan view, a front view, a side view, a bottom view, and a rear view, FIG. 3 is a perspective view illustrating a second body included in the mobile terminal of FIG. 1. FIG. 4 is a perspective view illustrating a state in which a first body has been extended from the second body in the mobile terminal of FIG. 1.

As shown in FIG. 1, the mobile terminal includes a broadcast receiver 1, a radio transceiver 2, a memory 3, a display unit 10, a camera 5, and a controller 4. Referring to FIG. 1, the broadcast receiver 1, radio transceiver 2, memory 3, display unit 10, camera 5, and controller 4 are appropriately arranged at a first body 100 or at a second body 200 in accordance with the function thereof.

For example, the broadcasting receiver 1 is arranged at the second body 200 to receive mobile broadcasting such as Korean terrestrial digital multimedia broadcasting (DMB) and satellite DMB, U.S. media forward link only (MediaFlo), and European digital video broadcasting-handheld (DVB-H).

The radio transceiver 2 is arranged, for example, at the second body 200, to process transmission and reception of radio signals associated with mobile communications. In particular, the radio transceiver 2 enables the user to perform various communication services, such as voice communication, short message service (SMS), multimedia message service (MMS), and E-mail, with a third party.

The memory 3 is arranged, for example, at the second body 200, to store various software, firmware, and various data required for operations of the mobile terminal. In particular, the memory 3 may store various multimedia contents to be played back in the mobile terminal.

The display unit 10 is arranged, for example, at the first body 100, to display information or images required for use of the mobile terminal. If necessary, the display unit 10 may be configured to permit a touch screen function, enabling the user to conveniently input more diverse commands using his/her finger(s) and/or a pen-like device.

The camera 5 is arranged, for example, on the back surface of the second body 200, to enable the user to photograph a still image or moving image of an object.

The controller 4 functions to control the broadcasting receiver 1, radio transceiver 2, memory 3, display unit 10, and camera 5. The controller 4 includes a multimedia player 4a for playing back multimedia contents. Accordingly, the controller 4 can play back multimedia contents stored in the memory 3. Furthermore, the multimedia player 4a may be provided as a constituent element independent of the controller 4.

In addition, the controller 4 performs a control operation to change the configuration of a screen of the display unit 10 (e.g., viewable screen size) in accordance with a degree of extension of the first body 100 from a receiving part. Here, the degree of extension refers to how much screen is viewable by the user.

For example, the controller 4 changes the information displayed on the screen of the display unit 10 or the font size of texts displayed on the screen of the display unit 10 in accordance with the outwardly-exposed area of the screen of the display unit 10. This will be described in more detail later.

The first body 100 is provided with a display 110 for displaying information desired by the user, and a panel 120 surrounding the display 110.

Referring to FIG. 3, the second body 200 includes a receiving part 210 for receiving the display 110. The display 110 can be completely received in the receiving part 210 or can be extended from the receiving part 210 in accordance with a user's selection.

The second body 200 has a substantially-rectangular shape. A cutout 220 is formed at one surface of the second body 200, for example, an upper surface of the second body 200, in order to allow the display 110 to display information even when the display 110 is completely received in the receiving part 210. That is, a part of the display 110 is available for viewing even when the display 110 is completely received by the receiving part 210.

The cutout 220 is formed at one of the two longer sides of the second body 200 such that the cutout 220 extends along one surface of the second body 200, for example, the upper surface of the second body 200. Here, the cutout 220 refers to a recessed area provided in the second body 200 for receiving the first body 100.

The "rectangular shape" described in the specification is not limited to mean that the neighboring sides forms a corner having an angle of 90°, as the meaning in the dictionary. The "rectangular shape" described in the specification includes even a shape that is recognizable to be a rectangular shape by the general public at first sight, even though it has round corners and opposite sides thereof have a slight length difference.

It is also acceptable to have the second body 200 with a circular shape or various polygonal shapes.

Referring to FIG. 4, the first body 100 can be inserted into or extended from the receiving part 210 in a sliding manner. For example, the peripheral edge of the first body 100, e.g., the panel 120, can be outwardly extended from the receiving part 210 while sliding along a guide 230 provided at the second body 200 toward the outside of the cutout 220.

Figure 5A:
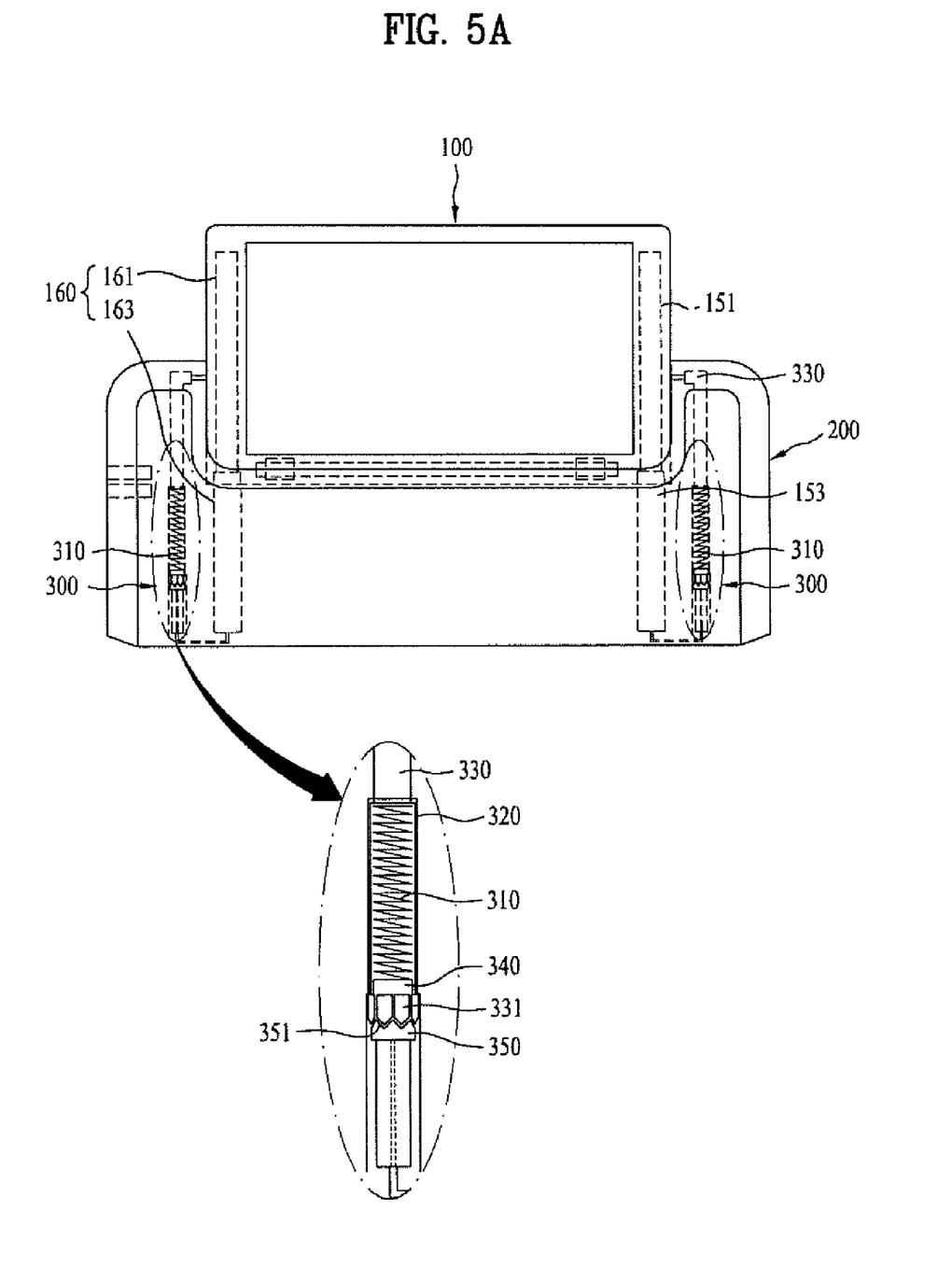
FIG. 5A is a sectional view illustrating an extended state of the first body from the second body in the mobile terminal of FIG. 1.
Figure 5B:
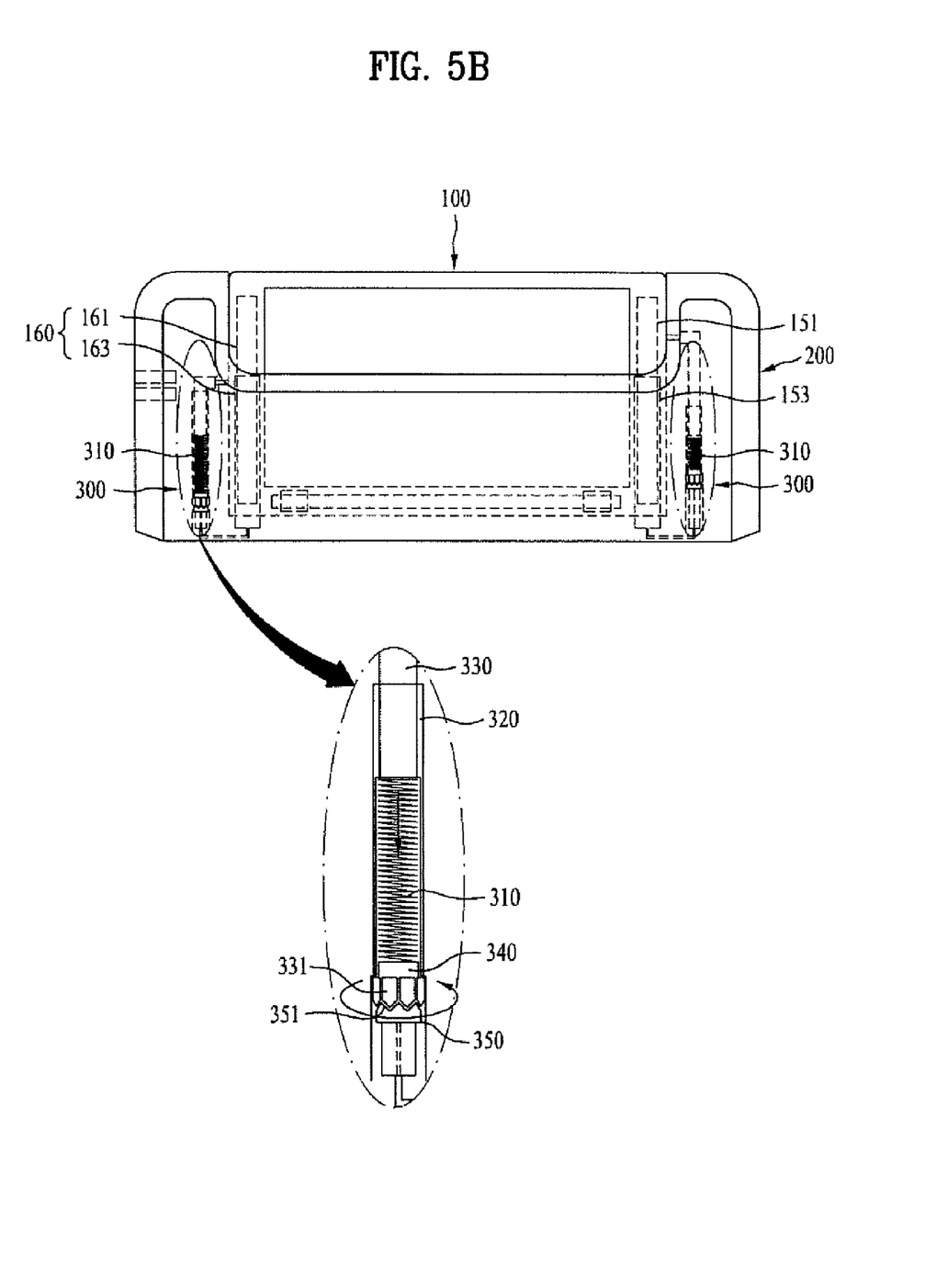
FIG. 5B is a sectional view illustrating a received state of the first body in the second body in the mobile terminal of FIG. 1.
Figure 6A:
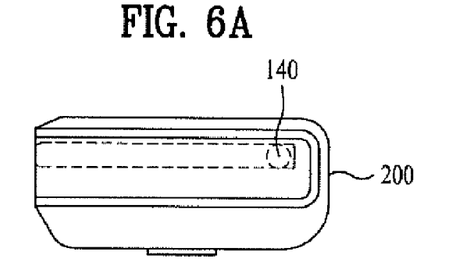
FIGS. 6A to 6D are lateral sectional views illustrating a procedure in which the first body rotates and moves with respect to the second body in the mobile terminal of FIG. 1.
Figure 6B:
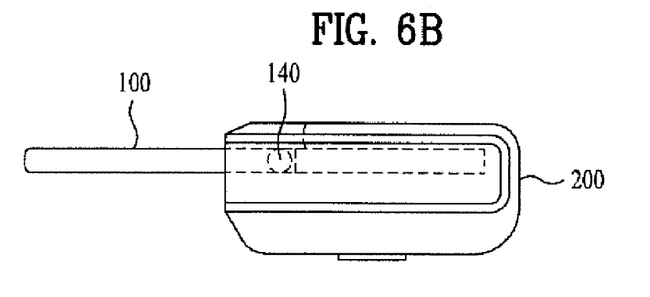
Figure 6C:
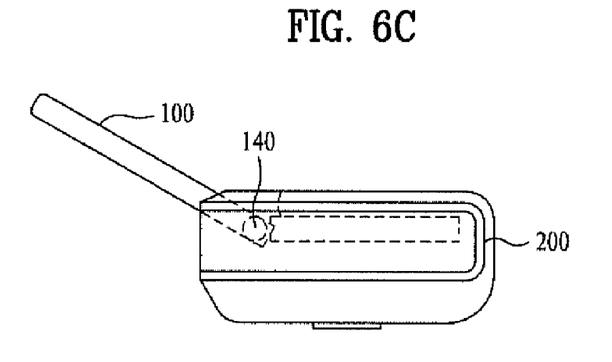
Figure 6D:
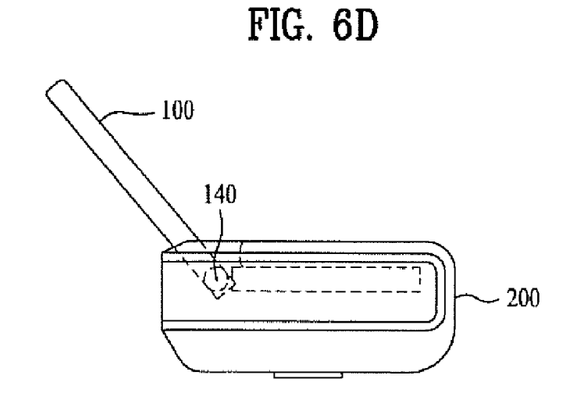

Procedures associated with inserting and extending the first body 100 into and from the second body 200 in the mobile terminal will be descried with reference to FIGS. 5A and 5B.

The mobile terminal according to the illustrated embodiment includes couplers 300 for coupling the first and second bodies 100 and 200. In detail, when the user applies slight-pressure and releases the pressure to the first body 100 in a received state the coupled state of the first and second bodies 100 and 200 maintained by the couplers 300 is temporarily released. At the same time, the first body 100 is automatically extended from the second body 200 in accordance with the resilience or elasticity of elastic members included in the couplers 300.

If the user presses the upper end of the first body 100 extended from the second body 200 until the first body 100 is completely inserted into the second body 200, the first body 100 is again coupled to the second body 200 by the couplers 300.

For example, each coupler 300 includes a moving member 330, which slides in conjunction with the first body 100, a coupling member 320 for receiving at least a portion of the moving member 330, a rotating member 350, which rotates while moving linearly in accordance with a movement of the moving member 330, and an elastic member 310 having a resilience/elasticity against the movement of the moving member 330.

The coupling member 320 provides a passage allowing at least portions of the moving member 330 and rotating member 350 to be inserted into the passage and to move along the passage. The moving member 330 is provided with first inclined protrusions 331 having inclined surfaces, whereas the rotating member 350 is provided with second inclined protrusions 351 having inclined surfaces corresponding to the inclined surfaces of the first inclined protrusions 331. The coupling member 320 is provided, at an inner surface thereof, with grooves (not shown) providing movement paths for the first and second inclined protrusions 331 and 351.

In accordance with the above-described structure of each coupler 300, if the user pushes the first body 100 toward the receiving part 210, the moving member 330 fixedly connected to the first body 100 is moved along with the first body 100.

At this time, the first inclined protrusions 331 of the moving member 330 pushes the second inclined protrusions 351 of the rotating member 350, thereby causing the rotating member 350 to rotate. As a result, the second inclined protrusions 351 of the rotating member 350 is selectively engaged with or disengaged from the grooves (not shown) of the coupling member 320. Thus, the first body 100 is selectively coupled to or released from the second body 200. Here, the elastic member has a resilience against the movement of the moving member 330.

The mobile terminal further includes an antenna for receiving a signal transmitted from the external source (e.g., mobile broadcasting). In detail, the antenna includes a first antenna 151 arranged at the first body 100, and a second antenna 153 arranged at the second body 200.

The first and second antennas 151 and 153 function as a single telescopic type antenna in a state in which the first body 100 is outwardly extended from the receiving part 210 of the second body 200, as shown in FIG. 5A.

On the other hand, when the first body 100 is received in the receiving part 210 of the second body 200, as shown in FIG. 5B, at least a portion of the first antenna 151 is received by the second antenna 153. In other words, at least a portion of the first antenna 151 is inserted to an inner space of the second antenna 153.

Thus, there is an advantage in that a desired antenna function can be efficiently achieved with a limited space. Here, the first and second antennas 151 and 153 are arranged inside of the first and second bodies 100 and 200 without being outwardly protruded or extended from the mobile terminal. Further, there is also an advantage in that the first and second antennas 151 and 153 do not interfere with external objects, while simplify the appearance of the mobile terminal.

The mobile terminal may also include a position sensor 160 for sensing the position of the first body 100 or second body 200.

The position sensor 160 includes a first position sensor 161 arranged at the first body 100, and a second position sensor 163 arranged at the second body 200 such that the second position sensor 163 corresponds to the first position sensor 161.

A method for identifying the positions of the first and second bodies 100 and 200 using the first and second position sensors 161 and 163 will be described in brief hereinafter.

If the first body 100 is received in the receiving part 210 of the second body 200, at least a portion of the first position sensor 161 is received in the second position sensor 163. As the first body 100 is extended from the receiving part 210, the insertion length of the first position sensor 161 inserted into the second position sensor 163 decreases gradually.

When the first body 100 is subsequently completely extended from the receiving part 210, the first position sensor 161 is also completely extended from the second position sensor 163. Here, the insertion length of the first position sensor 161 can be identified based on a resistance and/or a capacitance between the first and second position sensors 161 and 163.

The present invention is not limited to the above-described embodiment. Any other position sensor may be used as long as it can sense a movement of the first body 100 with respect to the second body 200.

For example, a light emitter for emitting light and a light receiver for receiving light may be provided at the second body 200, and a reflector for reflecting the light emitted from the light emitter may be provided at the first body 100, in order to detect the position of the first body 100 with respect to the second body 200.

In this case, the controller 4 may measure the amount of time taken for the light emitted from the light emitter to be received by the light receiver via the reflector, and thus, may measure the distance between the first and second bodies 100 and 200.

Data generated in accordance with the measurement by the position sensor 160 is used to adjust the screen size of the display 110 for displaying an image. This will be described in detail later.

Meanwhile, the first body 100 may be tilted or angled with respect to the second body 100 after being completely outwardly extended from the second body 200, as shown in FIGS. 6A to 6D. To this end, a hinge 140 is arranged between the first and second bodies 100 and 200. The hinge 140 may include an angle adjuster for adjusting the rotating angle of the first body 100 with respect to the second body 200. Accordingly, the user can conveniently view the screen of the display 110.

Hereinafter, the state of image information displayed on the display when an MP3 music file is played in the mobile terminal according to the present invention will be described with reference to FIGS. 7A and 7B.

Figure 7A:
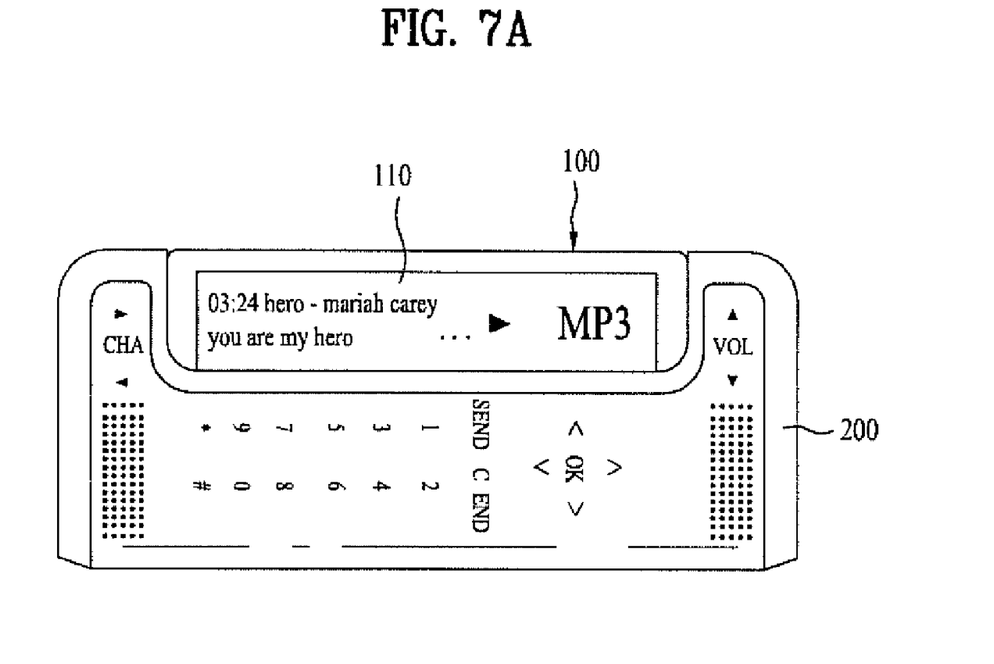
FIGS. 7A and 7B are front views illustrating a display in the mobile terminal of FIG. 1 when an MP3 music file is played hack.

Information is displayed on the screen even when the first body 100 is completely received in the receiving part 210 of the second body 200, as shown in FIG. 7A. In detail, an image associated with the MP3 music file (e.g., song title, song text, and artist) is displayed in various forms on a portion of the screen of the display 110, which corresponds to the size of the cutout ("220" in FIG. 3).

For example, a two-line text with a font size of 6 pt may be displayed in a sliding manner on the screen corresponding to the size of the cutout as the associated data (e.g., MP3 file) is accessed.

Thus, it is possible to achieve a reduction in power consumption because image information is displayed only on a screen portion of the display 110 of the first body 100, which is outwardly exposed in a received state of the display 110 in the receiving part 210, namely, a screen portion of the display 110 corresponding to the cutout.

Figure 7B:
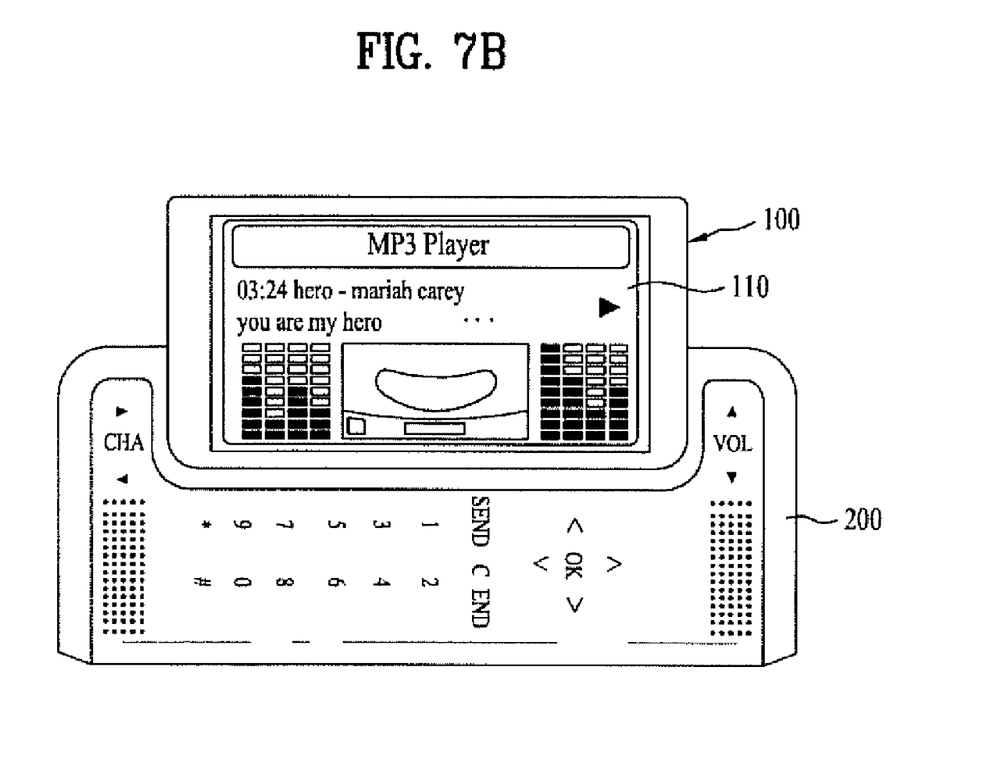

On the other hand, when an MP3 music file is played when the first body 100 is completely outwardly extended from the receiving part 210, as shown in FIG. 7B, an image associated with the MP3 music file is displayed in an appropriate form (e.g., a text with a font size of 8 pt and a wide graphic user interface (GUI) equalizer) on the screen of the display 110 in the whole screen size.

Thus, the controller 4 of the mobile terminal performs a control operation to change the configuration of the screen of the display unit 10 in accordance with an the degree of extension of the first body 100 from the second body 200. The degree of extension or protrusion of the first body 100 from the second body 200 may be measured using the position sensors as described with reference to FIG. 5.

Hereinafter, image information displayed on the display 110 when an SMS message is received by the mobile terminal according to the present invention will be described with reference to FIGS. 8A and 8B.

Figure 8A:
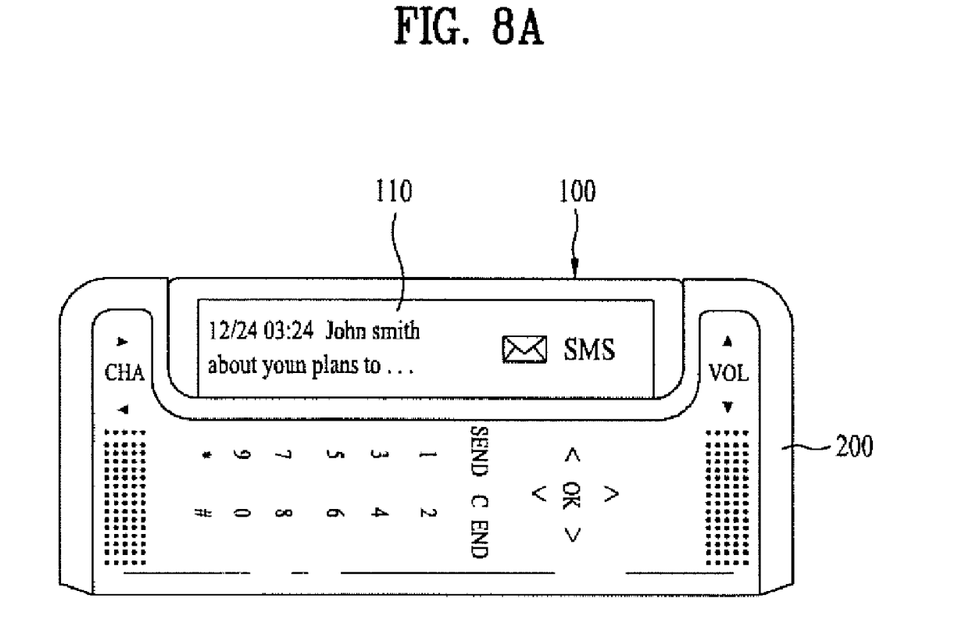
FIGS. 8A and 8B are front views illustrating the display in the mobile terminal of FIG. 1 when a short message service (SMS) message is received.

Information is displayed on the screen even when the first body 100 is completely received in the receiving part 210 of the second body 200, as shown in FIG. 8A. In detail, an image associated with an SMS message (e.g., originator, sent time, and message content) is displayed in various forms on a portion of the screen of the display 110, which corresponds to the size of the cutout 220.

Figure 8B:
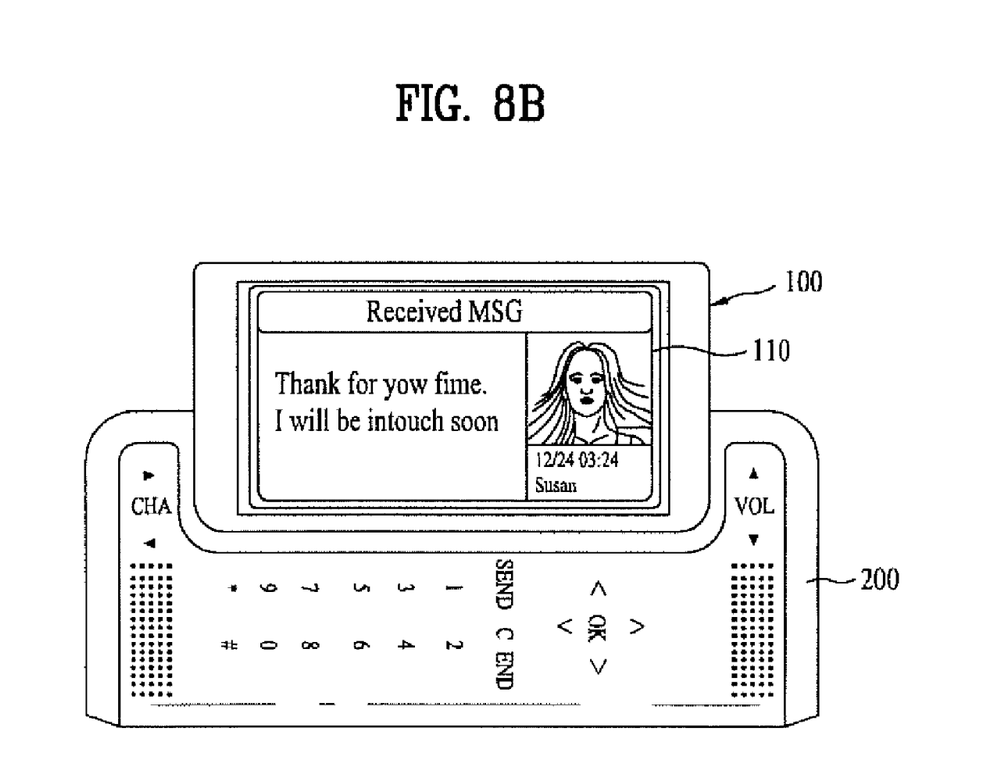

On the other hand, when the first body 100 is completely outwardly extended from the receiving part 210, as shown in FIG. 8B, information associated with the SMS message is displayed on the entire screen of the display 110.

No further detailed description will be given of the identification of the SMS message because image information associated with the SMS message is displayed on the display in a similar manner to that of playback of an MP3 music file.

Now, the procedure, in which the configuration of the screen of the display is changed in accordance with the extension degree of the display, will be described with reference to FIGS. 9A to 9C.

Figure 9A:
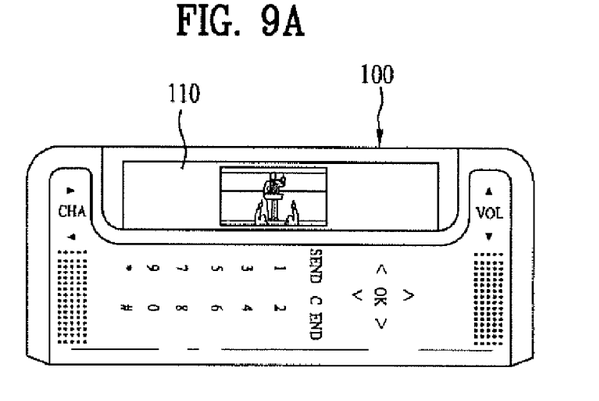
FIGS. 9A to 9C are front views illustrating the display in the mobile terminal of FIG. 1 when a moving image file is played back.

When the first body 100 is completely received in the receiving part 210, as shown in FIG. 9A, image information is displayed on a portion of the screen which is outwardly exposed through the cutout 220.

Figure 9B:
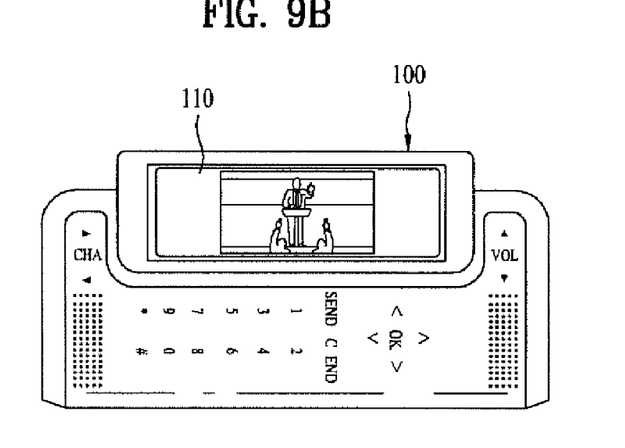
Figure 9C:
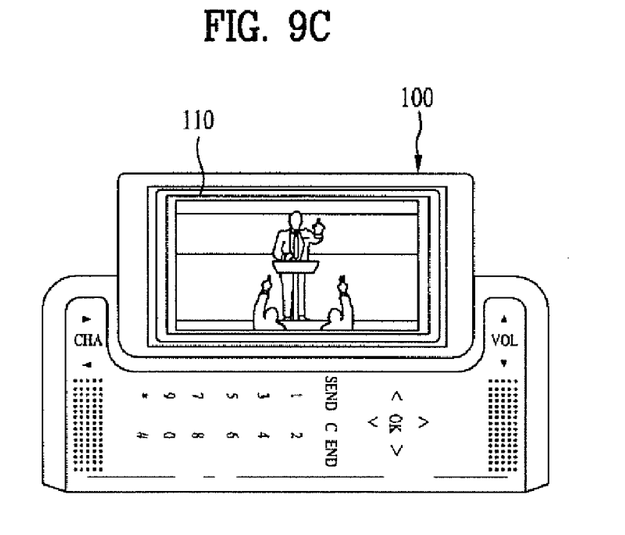

The screen size of the display 110 can be changed or modified in accordance with the degree of extension the display 110 of the first body 100 from the receiving part 210 of the second body 200, as shown in FIG. 9B or 9C. That is, the controller 4 included in the mobile terminal controls the screen size, based on the degree of extension of the display 110 from the receiving part 210.

The degree of extension of the first body 100 from the receiving part 210 can be identified through the position sensor as described above with reference to FIGS. 5A and 5B. As discussed, the degree of extension refers to the amount of screen that is slided outwardly from the completely received position. If the first body 100 is completely received, the viewable screen size of the display 110 is smaller than if the first body 100 is completely extended.

Thus, there is an advantage in that the user can view a moving image through a reduced-size screen at a position near the screen in a congested place, for example, in a subway train, by slightly extending the first body from the second body, and can view the moving image through a whole-size screen in a space allowing the user to be independent, by completely extending the first body from the second body.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The above-described mobile terminal according to the present invention has the following effects.

First, in accordance with the present invention, there is an advantage in that the user can easily identify desired information because a portion of the display is in an outwardly-exposed state.

For example, the display is configured to be tiltable in accordance with the position of the user. Accordingly, it is possible to more conveniently view multimedia contents played back through the mobile terminal.

Second, in accordance with the present invention, the screen size of the display can be automatically adjusted based on the extension degree of the first body with respect to the second body.

Accordingly, there is an advantage in that it is possible to conveniently view multimedia contents even in a congested place, for example, in a subway train, after appropriately adjusting the screen size. Also, there is an advantage in that it is possible to reduce the power consumption caused by the display, if necessary.

Third, in accordance with the present invention, the mobile broadcasting receiving antenna can be formed integrally with the housing of the terminal. Accordingly, there is an advantage in that it is possible to enhance the reliability of the mobile terminal because it is possible to receive mobile broadcasting without using an outwardly-protruded antenna.

Fourth, in accordance with the present invention, there is an advantage of a reduction in power consumption in that the display of the first body displays an image only on a screen portion exposed through the cutout when the display of the first body is completely received in the receiving part of the second body.

What is claimed is:

1. A mobile terminal comprising:
   a first body including a display; and
   a second body including a receiving part for receiving the first body, the receiving part having a part of a surface cut out to enable the display to display information while the first body is at least partially received by the second body.

2. The mobile terminal according to claim 1, wherein the first body is inserted into or drawn from the receiving part in a sliding manner.

3. The mobile terminal according to claim 1, further comprising:
   a position sensor for sensing a degree of extension of the display from the receiving part.

4. The mobile terminal according to claim 3, wherein the position sensor comprises a first position sensor arranged at the first body, and a second position sensor arranged at the second body such that the second position sensor corresponds to the first position sensor.

5. The mobile terminal according to claim 3, further comprising:
   a controller for adjusting a screen configuration displayed on the display, based on data measured by the position sensor.

6. The mobile terminal according to claim 1, further comprising:
   an antenna arranged in at least one of the first and second bodies, to receive information from an external source.

7. The mobile terminal according to claim 6, wherein the antenna comprises a first antenna arranged in the first body, and a second antenna arranged in the second body, the second antenna receiving at least a portion of the first antenna when the first body is inserted into the receiving part of the second body.

8. The mobile terminal according to claim 7, wherein the first and second antennas operate as an integral antenna when the first body is drawn from the receiving part of the second body.

9. The mobile terminal according to claim 1, further comprising:
   a guide for guiding a movement path of the first body when the first body is drawn from the second body.

10. The mobile terminal according to claim 1, further comprising:
    a coupler for coupling the first and second bodies when the first body is drawn from the receiving part, or releasing the first and second bodies from each other when the first body is inserted into the receiving part.

11. The mobile terminal according to claim 10, wherein the coupler comprises a moving member coupled to the first body, to move along with the first body, a rotating member operatively connected to the moving member, to rotate in accordance with the movement of the moving member, and an elastic member having a resilience against the movement of the moving member.

12. The mobile terminal according to claim 1, further comprising:
    a hinge for tilting the first body with respect to the second body in an extended state of the display from the receiving part.

13. A mobile terminal comprising:
    a first body including a display for displaying information;
    a second body having a front surface with a substantially-rectangular shape, the second body being opened at a portion of one longer side of the rectangular shaper to have a receiving part for receiving the first body;
    a mobile broadcasting receiver arranged in at least one of the first and second bodies; and
    a controller arranged in at least one of the first and second bodies, to control the display and the mobile broadcasting receiver.

14. The mobile terminal according to claim 13, wherein the receiving part has a front surface partially cut out to outwardly expose a portion of the display when the first body is completely received in the receiving part.

15. The mobile terminal according to claim 13, wherein the mobile broadcasting receiver includes an antenna arranged in the first body or in the second body such that the antenna is not outwardly exposed in a state when the first body is received in the receiving part.

16. The mobile terminal according to claim 13, wherein the mobile broadcasting receiver includes a first antenna arranged in the first body and a second antenna arranged in the second body, and the first and second antennas function as an integrated antenna when the first body is outwardly extended from the receiving part.

17. A mobile terminal comprising:
    a first body including a display for displaying information;
    a second body including a receiving part for receiving at least a portion of the first body having the display; and
    a controller configured to adjust the information shown on the display in accordance with an area of the display exposed outwardly.

18. The mobile terminal according to claim 17, wherein the controller controls the display to display the screen information in a screen size proportional to a degree of extension of the display from the receiving part.

19. The mobile terminal according to claim 17, wherein the display displays the screen information only on a partial display which is exposed outwardly when the display is received in the receiving part.

20. The mobile terminal according to claim 19, wherein the screen information on the display is displayed in a sliding manner such that the information shown on the display moves in a specified direction while being displayed.

* * * * *